United States Patent [19]
Karszes

[11] Patent Number: 6,060,003
[45] Date of Patent: May 9, 2000

[54] METHOD AND APPARATUS FOR MAKING LENTICULAR PLASTICS

[76] Inventor: William M. Karszes, 2720 Roxburgh Dr., Roswell, Ga. 30076

[21] Appl. No.: 08/741,738

[22] Filed: Oct. 31, 1996

Related U.S. Application Data

[63] Continuation-in-part of application No. 08/311,604, Sep. 23, 1994, abandoned.

[51] Int. Cl.[7] ..................................................... B29D 11/00
[52] U.S. Cl. ............................ 264/1.34; 264/1.6; 264/1.9
[58] Field of Search ............................... 264/1.1, 1.6, 2.7, 264/1.9, 1.34

[56] References Cited

U.S. PATENT DOCUMENTS

| | | | |
|---|---|---|---|
| 3,146,492 | 9/1964 | Lemelson | 264/1.6 |
| 3,839,514 | 10/1974 | Nauta | 264/1.6 |
| 4,601,861 | 7/1986 | Pricone et al. | 264/1.6 |
| 5,656,209 | 8/1997 | Benz et al. | 264/1.6 |

FOREIGN PATENT DOCUMENTS

WO93/13929  7/1993  WIPO ...................................... 264/1.6

*Primary Examiner*—Mathieu D. Vargot
*Attorney, Agent, or Firm*—Needle & Rosenberg PC

[57] ABSTRACT

A method and apparatus for producing a lenticular plastic sheet from a plastic sheet having a first surface and an opposite second surface employs a first chill roller having an outer surface, a patterned chill roller having an outer surface defining a first lenticular pattern thereon, disposed adjacent and parallel to the first chill roller so as to define a first nip therebetween and a second chill roller, having an outer surface and being spaced apart from the first chill roller and disposed adjacent and parallel to the patterned chill roller so as to form a second nip therebetween. A plastic sheet is extruded into the first nip so that the plastic sheet is molten as it passes into the first nip and so that the first surface of the plastic sheet is in contact with the first lenticular pattern, thereby facilitating the formation of a second lenticular pattern on the first surface. The second lenticular pattern is complimentary in shape to the first lenticular pattern. A belt is disposed about the first chill roller and the second chill roller that applies force to the second surface of plastic sheet in the direction of the patterned chill roller, thereby maintaining the first surface in contact with the first lenticular pattern on the patterned chill roller to inhibit distortion of the second lenticular pattern on the first surface of the plastic sheet as the plastic sheet cools from being in a molten state to a non-molten state.

13 Claims, 2 Drawing Sheets

METHOD AND APPARATUS FOR MAKING LENTICULAR PLASTICS

CROSS-REFERENCE TO RELATED APPLICATION

This is a continuation-in-part of my application Ser. No. 08/311,604 filed Sep. 23, 1994, hereby abandoned.

BACKGROUND OF THE INVENTION

The present invention relates to an extrusion method for forming plastic film. In particular, this invention relates to a process, and the products formed thereof, for forming a lenticular or non-lenticular optical product without the need of a carrier sheet that involves extrusion of at least one layer of plastic material, at least a three-roller system, and a continuous belt.

A lenticular plastic is a sheet of clear plastic that has a series of lenses running along its length. Alternately, a non-lenticular pattern may be used to direct rays of light to appropriate positions on or behind the sheet. In general, processes for making extruded lenticular-coated substrates are known. However, these processes suffer the disadvantage of requiring a high-cost substrate or carrier sheet material, which may represent one-half to two-thirds of the cost of the lenticular material. Although the carrier sheet material is relatively expensive, it has been necessary to provide it because it is essential for proper optical quality.

Lenticular-coated substrates can also be made on sheet lines or the lenticular layer can be cast using thermoplastic resins. However a sheet line process leads to unrestrained shrinkage during the cooling cycle and, thus, deformation of the lenses. Casting of thermoplastic resins is undesirable because this process is relatively slow and employs expensive resins.

This invention is based on the discovery that such optical distortion can be reduced, and the production of high-quality extruded optical sheets (lenticular and non-lenticular) without a carrier sheet (substrate) can be facilitated by controlling the shrinkage of one side of the extruded material. It has been found that the necessary control can be achieved in a three-roll system with the use of a continuous belt. The elimination of the carrier sheet produces a savings of about $1.50 to about $3.00 a pound as of the date of filing of this application, which may be more than half of the cost of the optical sheet. The reduction in cost should make possible more widespread application of this material in such uses as photographic material, flexible packaging, promotional materials, T-shirts, and other uses where printed matter can be used.

SUMMARY OF THE INVENTION

According to the present invention, there is provided a process for forming a lenticular (or non-lenticular patterned) plastic sheet without requiring a carrier sheet (substrate). In this process, at least one molten plastic material suitable for optical use is continuously extruded into a nip between a pair of at least approximately horizontally aligned chill rollers. A first one of the pair of chill rollers carries on its surface a pattern (lenticular or otherwise) to be embossed on the surface of the plastic sheet. The material is then cooled by rolling it between the first one of the chill rollers and a strippable belt, which is also wound around the surface of the rollers so that the molten plastic directly contacts the belt rather than the other one of the pair of chill rollers as it is poured into the nip. The belt applies pressure to the plastic against the patterned chill roller as it cools and a surface of the material adheres to the belt. Most of the heat is removed from the molten material (which eventually solidifies) from the surface pressed against the patterned chill roller. However, excessive shrinkage of the other surface is believed to be prevented by the combination of applied pressure and the adhering of the surface to the continuous belt. By preventing shrinkage of this side, a superior optical product not requiring a substrate for its production results. The material is guided by the first one of the pair of chill rollers and the belt to a third chill roller, and the belt (with the embossed plastic sheet over it) is guided over the third chill roller. Additional chill rollers may be provided if desired. The lenticular (or patterned) plastic is then stripped from the belt after being cooled by the last chill roller.

Thus, in one aspect, the invention is an apparatus for producing a lenticular plastic sheet having a first chill roller. A patterned chill roller having an outer surface defining a first lenticular pattern thereon, is disposed adjacent and parallel to the first chill roller so as to define a first nip therebetween. A molten plastic sheet, having a first surface, is extruded into the first nip so that the first surface is pressed against the outer surface on the patterned chill roller and so that a second lenticular pattern, complimentary in shape to the first lenticular pattern, is formed on the first surface. Force is applied on the plastic sheet, thereby maintaining the first surface in contact with the outer surface of the patterned chill roller as the plastic sheet cools from being in a molten state to being in a non-molten state. Applying such force inhibits deformation of the second lenticular pattern as the plastic sheet cools.

In another aspect of the invention, the apparatus includes a first chill roller having an outer surface. A patterned chill roller having an outer surface defining a first lenticular pattern thereon, is disposed adjacent and parallel to the first chill roller so as to define a first nip therebetween. A plastic sheet is extruded into the first nip, so that the plastic sheet is molten as it passes into the first nip and so that the first surface of the plastic sheet is in contact with the first lenticular pattern, thereby facilitating the formation of a second lenticular pattern on the first surface, the second lenticular pattern being complimentary in shape to the first lenticular pattern. A second chill roller, having an outer surface and being spaced apart from the first chill roller is disposed adjacent and parallel to the patterned chill roller so as to form a second nip therebetween. A belt is disposed about the first chill roller and the second chill roller. The belt has an exterior surface for applying force to the second surface of plastic sheet in the direction of the patterned chill roller and for maintaining the first surface in contact with the first lenticular pattern on the patterned chill roller thereby inhibiting distortion of the second lenticular pattern on the first surface of the plastic sheet as the plastic sheet cools from being in a molten state to a non-molten state. A drive causes the belt, the first chill roller, the second chill roller and the patterned chill roller to move in concert. The non-molten plastic sheet is separated from the belt after the plastic sheet has cooled to the non-molten state and passed out of the second nip by a separator.

Thus, it is an advantage of the present invention to provide a new process for forming a lenticular (or patterned) plastic sheet which is substantially less expensive to produce than prior art sheets requiring substrate material. Because force is exerted on the plastic sheet as it cools from being in a molten state to a non-molten state, shrinkage does not occur on the patterned surface of the plastic sheet, thereby ensuring superior optical quality. In addition, the processing can be arranged to roll the optical sheet off the processing machinery, eliminating the need to pull it off, which would result in further stress and damage to the optical quality of the finished material. Furthermore, because a uniform pressure is applied to the sheet during processing, a more uniform thickness can be achieved, which also results in a product of enhanced optical quality.

DETAILED DESCRIPTION OF THE INVENTION

Figure 1:
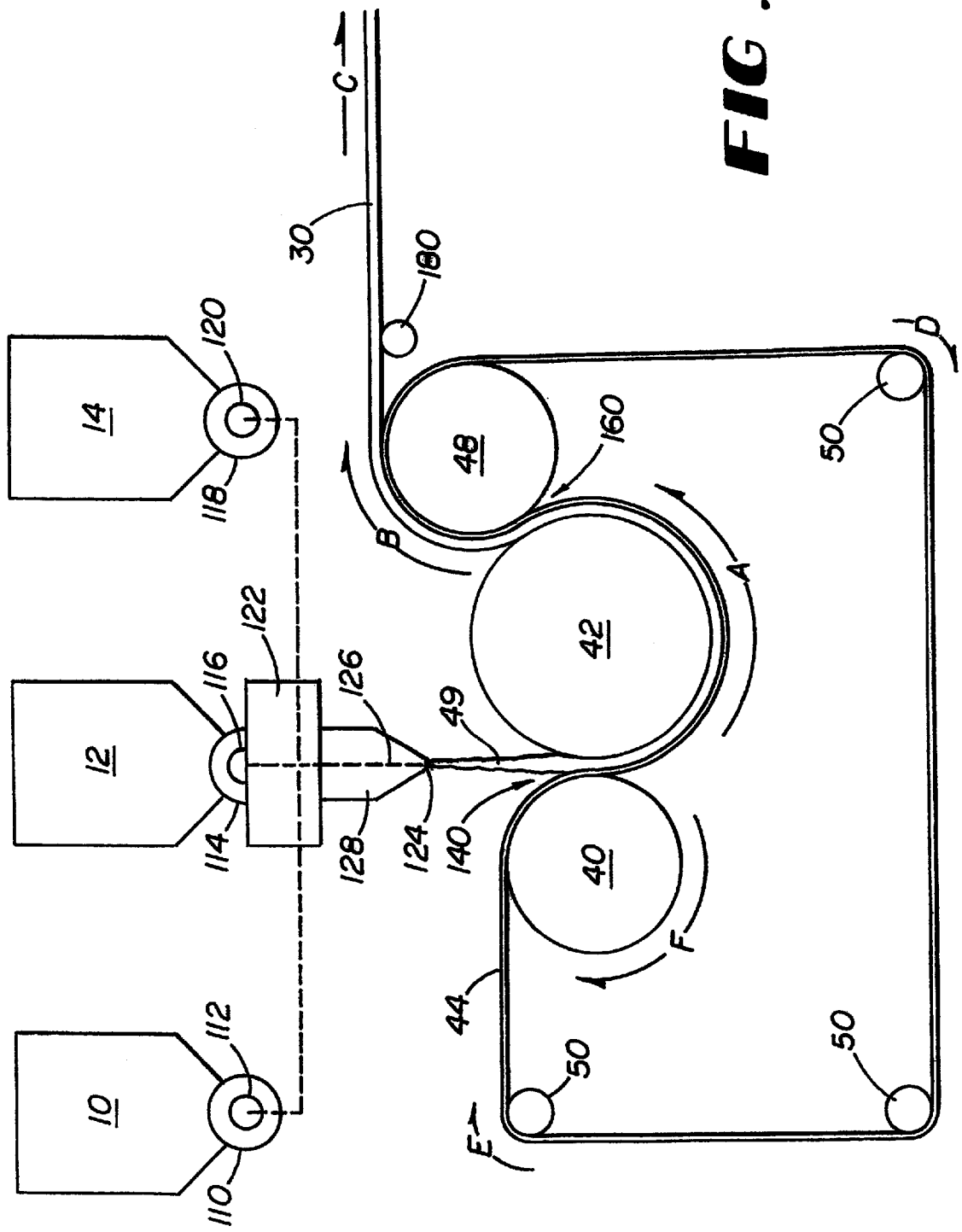
FIG. 1 is a schematic diagram of a preferred embodiment of the invention illustrating the fabrication of a three-layer lenticular sheet and the relationship of the chill rollers, nips, and continuous belt in accordance with the invention. The diagram is not drawn to scale.

Referring now to FIG. 1, a preferred embodiment of the invention is illustrated in which a three-layer lenticular sheet 30 is produced. The clear molten materials comprising the separate layers of the plastic sheet 30 are contained in separate reservoirs 10, 12, and 14. A continuous belt 44 is threaded around three chill rollers 40, 42, and 48 and through nip 140 between chill rollers 40 and 42, and nip 160 between chill rollers 42 and 48. Belt 44 is also threaded around tensioning rollers 50. In operation, roller 40 rotates in the direction shown by arrow F, roller 42 as shown by arrow A, and roller 48 as shown by arrow B. The molten plastic material 49 follows the path shown by arrows A, B, and C, solidifying at an unspecified point (not shown) along the path and emerging as a lenticular sheet 30. Concurrent with the rotation of the chill rollers 40, 42, and 48 as indicated, belt 44 moves along the path indicated by arrows A, B, D, and E. Roller rotation means (not shown) are provided to cause the rollers to rotate. Belt 44, which is tensioned against the rollers, will travel in the indicated path as the result of friction with the rollers. The precise means employed to cause the rollers to rotate and the belt to travel are not critical to the invention, however.

The preferred material for the top layer of sheet 30 is held in molten form in reservoir 14 and is preferably a polypropylene or polycarbonate resin. Although other clear plastics may be used, the preferred materials form lenticular surfaces that offer the desirable combination of abrasion resistance and high optical quality. The material for the middle layer in reservoir 12 is an adhesive layer of ethylene normal butyl-acrylate (ENBA), which has superior clarity and low cost, and, in addition, is easily processed. Other clear adhesive materials may also be used, provided that the material used can "grab" the two adjacent layers. The material for the bottom layer in reservoir 10 is an adhesion layer of polyethylene, polycarbonate, or polystyrene. The lower layers are designed for cost reduction and adhesion to the final substrate in the final product, and need not be as hard as the top layer, as they are protected by the top layer. There could alternately be two polycarbonate layers with a middle layer for cost reduction, or the entire structure could be manufactured in polycarbonate if the cost can be afforded.

The lenticular resin in reservoir 14 flows from the reservoir through lenticular resin flange 118 and lenticular resin adapter 120; the adhesive material in reservoir 12 flows from the reservoir through adhesive flange 114 and adhesive adapter 116, and the adhesion material in reservoir 10 flows through adhesion flange 110 and adhesion adapter 112. The resins contact one another in "black box" 122 and then flow through conduit 126 in die 128 and die opening 124. The compositions, temperature, pressure and flow rates are selected so that little or no shear exists at the interfaces of the molten materials when they contact each other. It is to be understood that, although a three-layered sheet 30 is described here, a sheet with any number of layers from one to about five may be produced using the appropriate number of materials and extrusion means, with the number of layers and their composition being selected in accordance with the desired end use of the sheet 30. (More than five layers are possible, and thus, this number should not be construed as a limitation on the invention; however, use of the preferred process and apparatus may, as a practical matter, become less convenient.)

The molten co-extruded material 49, which comprises three layers, one of each of the molten materials in reservoirs 10, 12, and 14, is extruded into a nip formed by chill rollers 40 and 42, through which a continuous belt 44 is threaded. Co-extruded material 49 is extruded so that the lenticular material contacts roller 42, while the adhesion material contacts belt 44. (The adhesive material is sandwiched between the other materials.) Roller 42 has a lenticular (or other) pattern engraved or otherwise embossed on its surface. Preferably, the lenticular pattern should be cut in a step-and repeat pattern. It should be noted that, although the embodiment is described as providing a lenticular pattern, any pattern, lenticular or not, that directs rays of light to an appropriate predetermined portion of the sheet may be provided in accordance with this invention. The pattern is impressed onto one side of the molten plastic material 49 by pressing roller 42 against the material at nip 140. Preferably, roller 40 should be a chill roller having a rubber surface. The nip would then be adjusted so that roller 40, belt 44, and roller 42 contact one another at the nip; material 49 will still flow through the nip because the surface of roller 40 is not rigid. Alternately, whether roller 40 is rigid (e.g., steel) or not, nip 140 may be adjusted to provide a gap appropriate for the desired thickness of the lenticular sheet 30. The molten plastic material 49 cools as it contacts roller 42 and continues on its path, indicated by arrow A, eventually solidifying with the lenticular (or other) pattern impressed on its top side, emerging in the direction indicated by arrow C as lenticular sheet 30. Belt 44 maintains pressure from the back side of the material 49 as it cools and roller 42 rotates. (The exact location at which molten material 49 solidifies to the three-layered solid sheet 30 is not shown because this location would vary for different types of materials and is not critical to the invention.)

The pressing of the pattern onto the molten plastic material 49 induces sufficient stress to cause optical distortions. This stress is caused by the combination of pressing and chilling by roller 42, both of which occur during the fabrication of the lenticular and non-lenticular materials. Shrinkage of liquid plastic polymers to solid plastics causes a volume shrinkage of between 0.98 to 0.92 for typical polymers. It has been discovered that if shrinkage is not limited to only one side of the lenticular plastic, the resulting material will have inferior optical qualities.

The use of belt 44 minimizes optical distortions by limiting the shrinkage of the back side of the plastic material without requiring a carrier sheet. The belt may comprise any material having suitable release properties for the plastic being extruded. Such materials can be readily determined by trial and error or experience, requiring only that the cooled plastic be readily releasable from the belt. Teflon®, polyester, mild steel, and stainless steel belts have been found satisfactory material for the belts used in conjunction with the plastics described in this specification. Once the plastic sheet is released, its edges can be trimmed to provide a uniform width and to remove irregular edges. It is also desirable to remove the edges because the unequal shrinkage of the top and the bottom of the sheet may subject the edges to additional stress, which could result in poorer optical quality at the edges of the material.

In addition to restricting shrinkage, continuous belt 44 serves several additional purposes. Belt 44 applies pressure while the plastic is held against the patterned roller 42 as the plastic cools. The pressure supplied must be sufficient to ensure that the shrinkage occurs only at the top (i.e., lenticular or patterned) surface, which can readily be determined by experimentation; in addition, the pressure applied must be adjusted to allow uniform thickness of the resulting plastic. Adjustment is best accomplished by observing the uniformity and shape of the lenticulars or other patterns in the solid plastic. Additionally, stress (as from improper pressure resulting in excess bottom shrinkage) can be observed by polarized light analysis of the plastic material as it emerges from the roller or it is removed from the belt. Moreover, as will be recognized from FIG. 1, neither the molten nor the solidified sheet 49, 30 touch the surface of rollers 40 or 48. Thus, neither rollers 40 nor 48 need be highly polished to ensure an optical quality smooth bottom surface of sheet 30. Roll 40 may be a rubber backup roll, which will allow more flexibility of distributing the stresses than a steel roll.

It has been determined for purposes of this invention that the most critical pressures to control are those where the molten material comes into the nip. However, it is also important to maintain enough pressure to keep the front surface of the lenticular plastic (i.e., the patterned side) in contact with the rollers, to ensure unidirectional heat flow from the back, so that the heat in the plastic is driven out the front side by contact with the chill rollers to minimize voids due to excess back side shrinkage. For this reason, the most preferable belt materials are those having relatively low heat conductivity.

Belt 44 is provided with tensioning means, which in one embodiment comprises adjustable rollers 50. Although the details of the tensioning means are not critical to the invention, it will be observed that rollers 50 adjust the pressure of belt 44 against the chill rollers 40, 42, and 48 while allowing the belt to move with the rotation of the chill rollers. Belt 44 is threaded through the apparatus so that it passes over the first chill roller 40 such that the surface of the first chill roller 40 is protected from contacting the molten plastic material extruded into the nip; i.e., the plastic is extruded into the nip between the belt 44 and the patterned roller 42. Cooling of the molten plastic takes place primarily by direct contact of the patterned surface of the plastic with the patterned chill roller 42. Some cooling also takes place on the belt side of the plastic in and near the nip because the belt is in contact with the first chill roller 40. However, because the direction of the belt and the rotation of the chill rollers transport the plastic away from the first chill roller 40, and since the belt is preferably made of relatively low heat conductivity material, most of the heat of the plastic is extracted from the patterned side while it is in contact with the patterned chill roller 42.

A third chill roller 48 is also provided. This third roller, in conjunction with the belt 44, serves to separate the lenticular material from the patterned roller 42 and to cool it further. Because it is preferable to perform the main portion of the heat extraction from the top surface of material 49, this roller is preferably positioned to permit the patterned chill roller to extract the maximum amount of heat from the front patterned surface of the material. Thus, the path of material 49 is such that it remains in contact with patterned roller 42 for more than 180° of its rotation, thereby maximizing the contact of the front surface of the material 49 with the patterned roller 42 and the consequent cooling of material 49 through its front lenticular surface. As the plastic material emerges from the second nip 160, it adheres to the continuous belt 44 as it is separated from the patterned roller 42. Belt 44 is wound around the third chill roller 48, which removes some of the heat from the material 49 through the belt which, by this point, has solidified, causing it to reach a temperature of 100° or less and emerge as sheet 30. It will readily be seen that additional chill rollers (not shown) may be provided to reach the 100 degree temperature, or, as illustrated, the lenticular plastic 30 may be lifted from the belt 44 by a separation roller 180 from which the plastic 30 may be collected into rolls or any other convenient form. Because no substrate or carrier sheet is required, no pulling of the lenticular plastic 30 is required, which further reduces the internal stresses in the sheet 30 compared to other prior art methods, thereby further ensuring high optical quality of the finished product. In addition, since the back side of the lenticular plastic 30 does not directly contact the rollers, the rollers do not need to be highly polished to ensure uniform smoothness of the back side of the lenticular material. It is only necessary to ensure the smoothness of the material used for the belt.

Thickness of lenticular material 30 that can be produced most practically by the inventive method and apparatus can be from about 0.003 in. to about 0.125 in., although these should not be regarded as limits to the invention. The number of layers used may be chosen to suit the desired application. For example, if the image is to be printed or laminated on, the back layer (i.e., the one forming the opposite side to the lens side) should have adhesive receptivity. Back layers can also be chosen to provide predetermined optical and mechanical properties; for example, they may be tinted. Abrasion-resistant plastic may be used for the lenticular layer. Although multiple layers may be desirable in many circumstances, a single layer material may also be produced by the method and apparatus described. In the latter case, only one reservoir of material would be required, and molten material 49 would comprise only one extruded substance.

A first example of lenticular plastic produced by the inventive apparatus and method is a three-layered product. The top layer is made of a clear polypropylene or polycarbonate material for abrasion resistance and optical quality. The second layer is an adhesive layer of ENBA (ethylene normal butyl-acrylate), which has superior clarity and low cost, and is easily processed, although any other clear adhesive that can "grab" the layers may be used instead. The third layer is an adhesion layer of polyethylene, polycarbonate, or polystyrene, which is softer than the top layer and has specialized properties related to image bonding.

A second example of a lenticular plastic produced with the inventive apparatus and method is a one-layer material consisting of flexible polyurethane thermoplastic. This material is extremely flexible, and is soft enough to be worn, making it useful for 3-D images that may be bonded to T-shirts, for example. Moreover, it is water and heat resistant and has high clarity. Production of one-layer lenticular material from flexible polyurethane thermoplastic is made possible because there is no pulling of the plastic sheet. In other processes where the lenticular plastic sheet must be pulled out, the induced stress produced in the product would be too great to allow production of a product of acceptable optical quality.

Another example of a lenticular plastic produced with the inventive apparatus and method is a five-layer material in which the first layer (i.e., the top, embossed layer) is a clear resin having good abrasion/mar resistance, the third layer is a layer of clear resins that act as a gas or odor barrier or as a filler layer for cost reduction, and the fifth layer (i.e., the rear layer) acts as an adhesion receptor for adhesives, inks, or other layers such as photo emulsions. The second and fourth layers act as adhesive tie layers holding the entire system together. Suggested materials for use in the top (first) layer include polystyrene, polycarbonate, polymethyl methacrylate, thermoplastic polyester, polypropylene, etc. Materials suggested for use in the adhesive (second and fourth) layers include ethyl methyl acrylate (EMA), ethyl vinyl acetate, and ethylene normal butyl acrylate. The middle (third) layer may comprise regrind (i.e., reground scrap), polyvinyl chloride (PVC), polyvinylidene chloride, or polypropylene. The back (fifth) layer may comprise polyethylene, thermoplastic elastomer, polyvinyl chloride, or ethyl vinyl acetate. These lists are not exhaustive, of course, and inspection of these lists will suggest other suitable materials to those skilled in the art.

The molten material 49 entering the first nip is generally in the range 200°–600° F., depending upon its composition. Material 49 starts to cool when it hits the roller. The lenticular material 30 must be cooled to about 100° F. or less at the end of the process. (As a rule of thumb, at about 100° F., most of the suitable materials strip well and have minimal deformation or distortion.) The sizes of the rollers 40, 42, and 48 used and the heat capacity required thereof may be readily determined by the required temperature drop, the thermal conductivity of the rollers, the heat capacity of the plastic(s) used, and the total volume of material passing through the production line. It is desirable to limit the variation in temperature across the surfaces of the rollers to no more than 3°. This variation is a good machine tolerance range because anomalies may develop if the temperature variation is greater than 3°.

Figure 2:
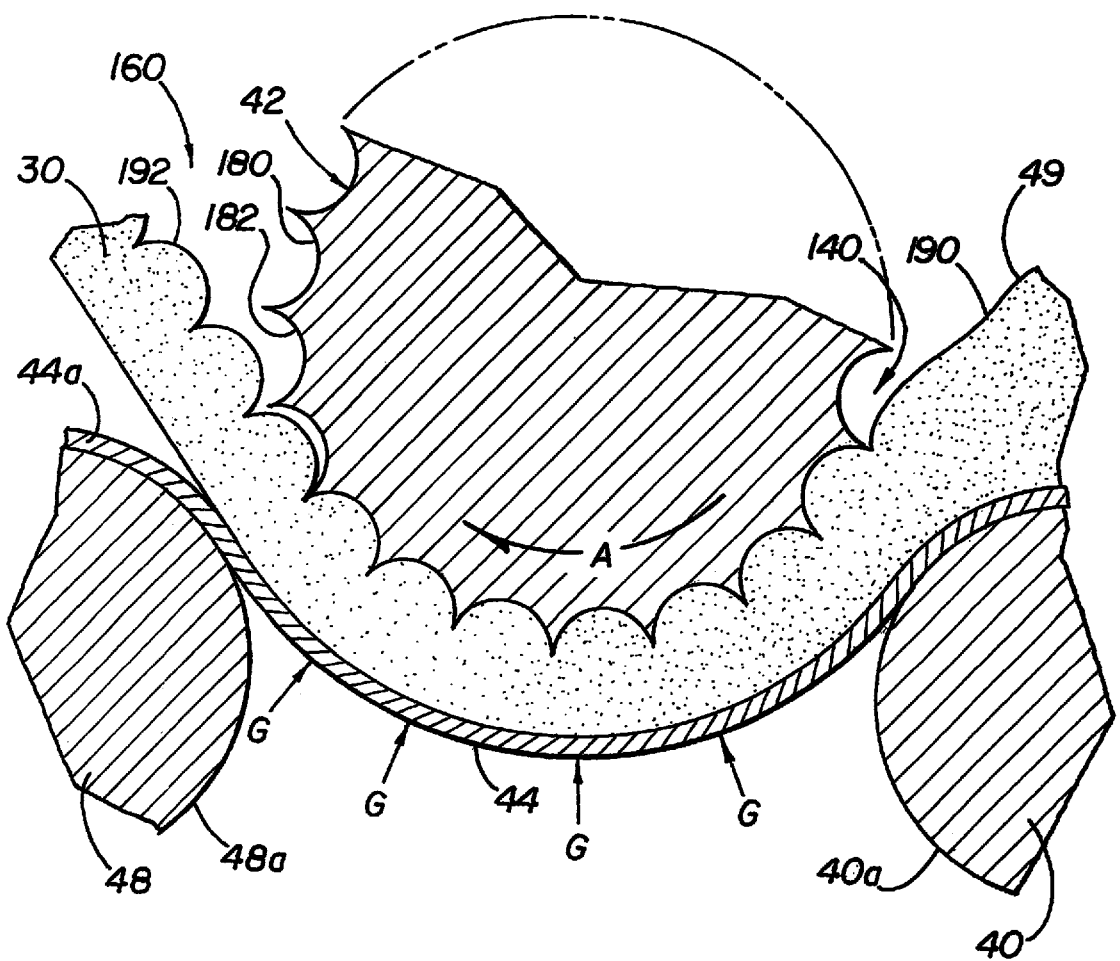
FIG. 2 is a partial cross-section showing a detail of the patterned chill roller and the belt of the invention.

FIG. 2 illustrates how the invention produces a lenticular plastic sheet 30 having minimal distortion of the lenticular patterned surface 192. Plastic 49 in a molten state is extruded into a nip 140 defined by the first chill roller 40 and the patterned chill roller 42. The patterned chill roller 42 has an outer surface 180 defining a first lenticular pattern 182 thereon. The patterned chill roller 42 is disposed adjacent and parallel to the first chill roller 40 so as to define a first nip 140 between the outer surface 40a of the first chill roller 40 and the outer surface 180 of the patterned chill roller 42. The plastic sheet is molten 49 as it passes into the first nip 140. The first surface 190 of the plastic sheet 30 is in contact with the first lenticular pattern 182, thereby facilitating the formation of a second lenticular 192 pattern on the first surface 190. The second lenticular pattern 192 is complimentary in shape to the first lenticular pattern 182.

A second chill roller 48, having an outer surface 48a, is spaced apart from the first chill roller 40 and disposed adjacent and parallel to the patterned chill roller 42 so as to form a second nip 160 therebetween. A belt 44 is disposed about the first chill roller 40 and the second chill roller 48. The belt 44 has an exterior surface 44a for applying force to the second surface 194 of plastic sheet 30 in the direction G of the patterned chill roller 42, thereby maintaining the first surface 190 in contact with the first lenticular pattern 182 on the patterned chill roller 42. This contact inhibits distortion of the second lenticular pattern 192 on the first surface 190 of the plastic sheet 30 as the plastic sheet 30 cools from being in a molten state to a non-molten state. This is because the molten plastic 49 is constantly being forced against the first lenticular pattern 182, thereby filling in for any shrinkage of the plastic sheet 30 that occurs during the cooling process.

As can be seen, the belt 44, the first chill roller 40, the second chill roller 48 and the patterned chill roller 42 all move in concert in direction A, thereby keeping the plastic sheet 30 moving through the system.

Although the present process has been described with reference to specific details of certain embodiments thereof, it is not intended that such details should be regarded as limitations upon the scope of the invention except as and to the extent that they are included in the accompanying claims.

What is claimed is:

1. A method of producing a lenticular plastic sheet, comprising the steps of:
   a. extruding a molten plastic sheet into a nip defined between a first chill roller and a patterned chill roller having an outer surface defining a first lenticular pattern thereon, thereby impressing a second lenticular pattern, complimentary in shape to the first lenticular pattern, onto the plastic sheet;
   b. cooling the plastic sheet as it is in contact with the patterned chill roller; and
   c. applying force on the plastic sheet in the direction of the patterned chill roller as the plastic sheet cools from being in a molten state to being in a non-molten state, so as to inhibit deformation of the second lenticular pattern as the plastic sheet cools.

2. The method of claim 1, wherein the plastic sheet comprises a flexible polyurethane thermoplastic.

3. The method of claim 1, wherein the plastic sheet comprises polystyrene.

4. The method of claim 1, wherein the plastic sheet comprises polycarbonate.

5. The method of claim 1, wherein the plastic sheet comprises polymethyl methacrylate.

6. The method of claim 1, wherein the plastic sheet comprises polyethylene terephthlate glycol.

7. The method of claim 1, wherein the plastic sheet comprises polypropylene.

8. A method of producing a lenticular plastic sheet, comprising the steps of:
   a. co-extruding multiple layers of a molten plastic sheet into a nip defined between a first chill roller and a patterned chill roller having an outer surface defining a first lenticular pattern thereon, thereby impressing a second lenticular pattern, complimentary in shape to the first lenticular pattern, onto the plastic sheet;
   b. cooling the plastic sheet as it is in contact with the patterned chill roller; and
   c. applying force on the plastic sheet in the direction of the patterned chill roller as the plastic sheet cools from being in a molten state to being in a non-molten state, so as to inhibit deformation of the second lenticular pattern as the plastic sheet cools.

9. The method of claim 8, wherein the multiple layers comprise:
   a. a first layer comprising a plastic selected from the group consisting of clear polypropylene and clear polycarbonate;

b. a second layer comprising an adhesive layer of ethylene methacrylate; and c. a third layer comprising an adhesion layer of a material selected from the group consisting of polyethylene, polycarbonate, and polystyrene, wherein the impressing step comprises impressing the second lenticular pattern on the first layer.

10. The method of claim 8, wherein the multiple layers comprise:

a. a first layer of clear resin comprising a material selected from the group consisting of polystyrene, polycarbonate, polymethyl methacrylate, thermoplastic polyester, and polypropylene;

b. a second layer comprising a material selected from the group consisting of ethyl methyl acrylate, ethyl vinyl acetate, and ethylene normal butyl acrylate;

c. a third layer comprising a material selected from the group consisting of regrind, polyvinyl chloride, polyvinylidene chloride, and polypropylene;

d. a fourth layer comprising a material selected from the group consisting of ethyl methyl acrylate, ethyl vinyl acetate, and ethylene normal butyl acrylate; and e. a fifth layer comprising a material selected from the group consisting of polyethylene, thermoplastic elastomer, polyvinyl chloride, and ethyl vinyl acetate, wherein the impressing step comprises impressing the second lenticular pattern on the first layer.

11. The method of claim 8, wherein in the coextruding step, the plastic sheet is at a temperature in the range of 200° F. to 600° F.

12. The method of claim 8, wherein the cooling step comprises cooling the plastic sheet to approximately 100° F.

13. The method of claim 8, further comprising the step of controlling the temperatures of each of the first and patterned chill rollers to prevent temperature gradients across the surface of each of the rollers from exceeding 3° F.

* * * * *